(12) United States Patent
Colbert et al.

(10) Patent No.: US 7,414,085 B2
(45) Date of Patent: Aug. 19, 2008

(54) COATING FOR WALL CONSTRUCTION

(75) Inventors: Elizabeth Colbert, Newark, DE (US); Andrew B. Bingaman, Dillsburg, PA (US); Marc Domenech, La Roque sur Pernes (FR); Kenneth B. O'Connor, Ashburn, VA (US); Göran Hedman, Rochefort du Gard (FR)

(73) Assignee: Lafarge Platres, Avignon (FR)

( * ) Notice: Subject to any disclaimer, the term of this patent is extended or adjusted under 35 U.S.C. 154(b) by 516 days.

(21) Appl. No.: 10/824,336

(22) Filed: Apr. 14, 2004

(65) Prior Publication Data

US 2005/0234174 A1  Oct. 20, 2005

(51) Int. Cl.
*C08K 3/26* (2006.01)
(52) U.S. Cl. .............. 524/425; 524/445; 524/449; 524/500; 524/522; 524/523
(58) Field of Classification Search ............ 524/522, 524/523, 500, 425, 445, 449
See application file for complete search history.

(56) References Cited

U.S. PATENT DOCUMENTS

| | | | |
|---|---|---|---|
| 1,439,289 A | 12/1922 | Buttress | |
| 1,993,472 A | 3/1935 | Borsari-Fischer | |
| 2,109,719 A | 3/1938 | Brusse | |
| 2,205,423 A | 6/1940 | Lefubre | |
| 2,754,795 A | 7/1956 | Enssle | |
| 2,770,216 A | 11/1956 | Schock | |
| 2,833,139 A | 5/1958 | Bosshard | |
| 2,925,631 A | 2/1960 | Larson et al. | |
| 3,003,979 A | 10/1961 | Ptasienski et al. | |
| 3,180,058 A | 4/1965 | Tillisch et al. | |
| 3,256,223 A | 6/1966 | Heijmer | |
| 3,284,980 A | 11/1966 | Dinkel | |
| 3,303,147 A | 2/1967 | Elden | |
| 3,382,119 A | 5/1968 | Henkel | |
| 3,411,926 A | 11/1968 | Gogek et al. | |
| 3,422,587 A | 1/1969 | Murray | |
| 3,576,091 A | 4/1971 | Shull, Jr. et al. | |
| 3,630,742 A * | 12/1971 | Crawford et al. ............ | 430/529 |
| 3,708,935 A | 1/1973 | Kossuth et al. | |
| 3,819,395 A | 6/1974 | Yocum | |
| 3,835,074 A | 9/1974 | Desmarais | |
| 3,907,725 A | 9/1975 | Forte et al. | |
| 3,975,320 A | 8/1976 | Lane et al. | |
| 3,984,596 A | 10/1976 | Failmezger | |
| 4,018,732 A * | 4/1977 | Lakshmanan ............... | 524/270 |
| 4,117,183 A | 9/1978 | Long | |
| 4,178,273 A * | 12/1979 | Brown ........................ | 524/432 |
| 4,205,041 A | 5/1980 | Hymes | |
| 4,238,239 A | 12/1980 | Brown | |
| 4,287,103 A | 9/1981 | Francis et al. | |
| 4,294,622 A | 10/1981 | Brown | |
| 4,448,639 A | 5/1984 | Long | |
| 4,454,267 A | 6/1984 | Williams | |
| 4,558,079 A | 12/1985 | Desmarais | |
| 4,579,610 A | 4/1986 | Kole et al. | |
| 4,657,594 A | 4/1987 | Struss | |
| 4,661,164 A | 4/1987 | Severinghaus, Jr. et al. | |
| 4,672,787 A | 6/1987 | Murphy | |
| 4,686,253 A | 8/1987 | Struss et al. | |
| 4,720,303 A | 1/1988 | Soldatos | |
| 4,725,477 A | 2/1988 | Kole et al. | |
| 4,743,475 A | 5/1988 | Negri et al. | |
| 4,820,754 A | 4/1989 | Negri et al. | |
| 4,845,152 A | 7/1989 | Palmer | |
| 4,859,248 A * | 8/1989 | Thaler et al. ................. | 127/32 |
| 4,959,272 A | 9/1990 | Long | |
| 4,965,031 A | 10/1990 | Conroy | |
| 4,972,013 A | 11/1990 | Koltisko, Jr. et al. | |
| 4,988,543 A | 1/1991 | Houle et al. | |
| 5,019,195 A | 5/1991 | Skinner | |
| 5,039,341 A | 8/1991 | Meyer | |
| 5,055,323 A | 10/1991 | Kole et al. | |
| 5,079,042 A | 1/1992 | Frings | |
| 5,088,260 A | 2/1992 | Barton et al. | |
| 5,102,462 A | 4/1992 | Podlas | |
| 5,143,757 A | 9/1992 | Skinner | |
| 5,207,830 A | 5/1993 | Cowan et al. | |
| 5,230,200 A | 7/1993 | Douglas et al. | |

(Continued)

FOREIGN PATENT DOCUMENTS

AU        19322/92        1/1993

(Continued)

OTHER PUBLICATIONS

Machine Translation DE 4324315 A (1994).*

(Continued)

*Primary Examiner*—Edward J Cain
(74) *Attorney, Agent, or Firm*—Buchanan Ingersoll Rooney PC

(57) ABSTRACT

A coating for wall construction is provided whereby a level 5 finish may be obtained without the need for a finishing coat or final skim coat. The coating may be applied to drywall elements prior to installation and is compatible with jointing materials such that a substantially homogeneous surface may be obtained after the drywall elements are assembled with jointing material and the jointing material is dried. The coating formulation includes a noncellulosic thickener, a binder, a mineral filler and water. A method for the construction of interior walls and a construction assembly for interior walls is further provided.

21 Claims, No Drawings

U.S. PATENT DOCUMENTS

| | | | |
|---|---|---|---|
| 5,258,069 | A | 11/1993 | Knechtel et al. |
| 5,277,712 | A | 1/1994 | McInnis |
| 5,334,243 | A | 8/1994 | Hyman |
| 5,336,318 | A | 8/1994 | Attard et al. |
| 5,487,250 | A | 1/1996 | Yount et al. |
| 5,552,187 | A * | 9/1996 | Green et al. ............. 427/389.8 |
| 5,653,797 | A | 8/1997 | Patel |
| 5,714,032 | A | 2/1998 | Ainsley et al. |
| 5,746,822 | A | 5/1998 | Espinoza et al. |
| 5,779,786 | A | 7/1998 | Patel |
| 5,869,166 | A * | 2/1999 | Caldwell ................... 428/142 |
| 5,908,521 | A | 6/1999 | Ainsley et al. |
| 5,922,447 | A | 7/1999 | Baig |
| 5,945,198 | A | 8/1999 | Deodhar et al. |
| 5,987,835 | A | 11/1999 | Santarossa |
| 6,077,966 | A | 6/2000 | Matsumura et al. |
| 6,105,325 | A | 8/2000 | Zuber et al. |
| 6,106,607 | A | 8/2000 | Be et al. |
| 6,165,261 | A | 12/2000 | Wantling |
| 6,171,388 | B1 | 1/2001 | Jobbins |
| 6,177,180 | B1 | 1/2001 | Bodine et al. |
| 6,221,521 | B1 | 4/2001 | Lynn et al. |
| 6,238,476 | B1 | 5/2001 | Sprinkle |
| 6,268,042 | B1 | 7/2001 | Baig |
| 6,436,185 | B1 | 8/2002 | Ayambem et al. |
| 6,645,291 | B2 | 11/2003 | Ayambem et al. |
| 6,663,979 | B2 | 12/2003 | Deodhar et al. |
| 6,673,144 | B2 * | 1/2004 | Immordino, Jr. et al. .... 106/778 |
| 6,733,581 | B2 | 5/2004 | Langford |
| 7,047,701 | B2 | 5/2006 | Bonetto et al. |
| 2002/0086114 | A1 | 7/2002 | Madsen |
| 2002/0121326 | A1 | 9/2002 | Adler et al. |
| 2003/0084633 | A1 | 5/2003 | Zuber et al. |
| 2003/0085306 | A1 | 5/2003 | John et al. |
| 2003/0113572 | A1 | 6/2003 | Deodhar et al. |
| 2003/0153651 | A1 | 8/2003 | Bonetto et al. |
| 2004/0154264 | A1 | 8/2004 | Colbert |
| 2004/0209074 | A1 * | 10/2004 | Randall et al. .............. 428/341 |
| 2004/0216424 | A1 | 11/2004 | Zuber et al. |
| 2004/0237436 | A1 | 12/2004 | Zuber et al. |
| 2005/0065256 | A1 * | 3/2005 | Kyte et al. .................. 524/425 |
| 2005/0229519 | A1 | 10/2005 | Colbert et al. |
| 2005/0246993 | A1 | 11/2005 | Colbert et al. |
| 2005/0252128 | A1 | 11/2005 | Colbert et al. |
| 2006/0048684 | A1 | 3/2006 | Bonetto et al. |

FOREIGN PATENT DOCUMENTS

| | | |
|---|---|---|
| AU | 719427 | 5/2000 |
| CA | 2259115 | 8/1999 |
| DE | 142 872 | 7/1980 |
| DE | 37 21 668 A1 | 5/1989 |
| DE | 43 24 315 A1 | 10/1994 |
| DE | 43 31 141 | 3/1995 |
| EP | 0 496 682 A1 | 7/1992 |
| EP | 0 521 804 B1 | 7/1993 |
| EP | 1 182 235 A1 | 2/2002 |
| FR | 2166536 | 8/1973 |
| FR | 2 505 908 | 11/1982 |
| FR | 2 736 079 A1 | 3/1997 |
| FR | 2818635 | 6/2002 |
| FR | 2818968 | 7/2002 |
| GB | 1 513 763 | 6/1978 |
| GB | 2228931 | 9/1990 |
| JP | 60-065197 | 4/1985 |
| JP | 09-109131 | 4/1997 |
| WO | 97/02395 A1 | 1/1997 |
| WO | 99/08979 | 2/1999 |
| WO | 99/48833 | 9/1999 |
| WO | 99/57371 | 11/1999 |
| WO | 00/06518 | 2/2000 |
| WO | 02/06813 | 1/2002 |
| WO | WO 02/06183 A1 | 1/2002 |
| WO | 02/12144 A2 | 2/2002 |
| WO | 02/058902 A2 | 8/2002 |
| WO | 2005/040475 | 5/2005 |

OTHER PUBLICATIONS

International Search Report issued in a corresponding European application.
Written Opinion of the International Searching Authority issued in a corresponding European application.
J.R. Gorman, et al., "Plaster and Drywall Systems Manual," BNI Books, Division of Building News, Inc., Apr. 12, 2003, pp. 240 and 251.
The White Book 1986 Edition, British Gypsum, Apr. 12, 2003.
The White Book, Plasterboard Fixing, Jointing and Decorating, British Gypsum, Apr. 12, 2003.
G.D. Plumb, M.A., Lightweight Partitions Having Improved Low Frequency Sound Insulations, Research and Development Department, 10 pages, 1995.
9 White, Medium Calcium Carbonate Filler, Georgia Marble Company, May 1996.
Water Absorbency of Bibulous Papers, T 432 cm—99, Approved by the Physical Properties Committee of the Process and Product Quality Division, 1999.
Water Absorbency of Bibulous Papers, T 432 om—94, Approved by the Chemical Properties Committee of the Process and Product Quality Division, 1994.
Standard Conditioning and Testing Atmospheres for Paper, Board, Pulp Handsheets and Related Products, T 402 om—93, Approved by the Physical Properties Committee of the Process and Product Quality Division, 1993.
Gypsum Plasterboards, Mar. 1995, 30 pages.
Ken A. Phillips, et al., Industrial Minerals in Arizona's Wallboard Joint Cement Industry, Jul. 1989, 6 pages.
Ken Phillips, et al., Industrial Minerals in Southern California's Wallboard Joint Cement Industry, Sep. 1989, 6 pages.
Gypsum Plasterboard—Part 1: Specification for Plasterboard Excluding Material Submitted to Secondary Operations, 1985, 10 pages.
Dry Lining and Partitioning Using Gypsum Plasterboard, British Standard, 1995, 50 pages.
Sauli Rennes, et al., The Influence of Binders on the Structure and Water Sorption of Coated Paper, Apr. 12, 2003, pp. 698-703.
Technical Data, Calmote Ad, Omya UK, 1997.
Attagel 50, Engelhard, 2003.
Engelhard Material Safety Data Sheet, Lawrence Industries, Apr. 19, 1992.
Fordamin Stinnes Logistics, Fordacal S2 Talc, 2001.
Defoamers for Emulsion Paints and Emulsion Plasters, BYK Chemie, 4 pages, 2002.
Emultex 596, Synthomer International Technology Individual Service, 2002.
Sil-Cell 35/34, Silbrico Corporation, 2 pages, 1993.
Methocel Cellulose Ethers for Gypsum-Based Building Materials, How Methocel Cellulose Ethers Products Maximise the Performance of Gypsum-based Building Materials, 1999.
Elotex LIQ2020, Technical Data Sheet, 2003.
Twinstar Chemicals Limited, Benzoflex 9-88 Plasticiser Dipropyleneglycol Dibenzoate, 5 pages, 2003.
International Search Report.
Written Opinion of the International Searching Authority.
"ACUMER® 9400—Dispersant for Paper and Paperboard Coatings", Rohm and Haas Company, Special Polymers, 1994.
"ACUMER® 9300—Dispersant for Paper and Paperboard Coatings", Rohm and Haas Company, Special Polymers, 1994.
George M. Kutcher, Jr., CDT, CSI, "Revisiting the Levels of Gypsum Board Finish", National Gypsum Company, pp. 1-3, 2004.
A Marquer D'Une Pierre Blanche . . . , 11 pages.
Pregyplac Deco la nouvelle plaque blanche, Lafarge Platres, Jul. 1995.

Dan Eklund, "The Influence of Binders and Pigments upon the K&N Ink Absorption of Coated Papers", No. 9, 1973 Papper och Trä.

Chemical Abstracts, vol. 103, No. 8, Aug. 26, 1985, Abstract No. 58270z, pp. 278; XP 000185205; Abstract of JP 60 065197.

Database WPI, Week 199727, AN 1997-293470, XP002198594, Abstract of JP 09 109131.

Derwent WPI AN 1997-109001, Week 199710, Abstract of WO 9702395.

Derwent WPI AN 1989-016493, Week 198903, English Abstract of DE 3721668.

Derwent WPI AN 1993-002309, Week 199301, English Abstract of EP 0521804.

Decision, Jun. 14, 2005, Appeal No. T 1032/03-3.2.3, and translation thereof.

New Zealand Opposition Paper in Patent No. 527112 dated Dec. 18, 2006.

International Preliminary Examination Report issued in a corresponding PCT application.

\* cited by examiner

COATING FOR WALL CONSTRUCTION

FIELD OF THE INVENTION

A coating and coating formulation for improved drywall installation are provided. A method for constructing interior walls including applying the coating and a construction assembly formed with the use of the coating are further provided.

BACKGROUND

Interior walls typically are installed by use of flat, prefabricated boards which are assembled with the use of jointing material such as joint compounds, sealing coats, joint coats and/or joint-pointing coats. The prefabricated elements can be gypsum fiberboards, cement fiberboards, gypsum wallboards or plaster boards and the like. The flat, prefabricated boards typically include at least one sheet of lining paper, at least one outer layer of which has a visible outer face ready to be decorated. Generally, in the construction of interior walls, flat prefabricated elements, or drywall elements, are fastened to wall frames by, for example, nails or screws, and the joints taped or plastered with a jointing material. The prefabricated elements are assembled together, optionally with a jointing material and the joints are finished with a sealing coat, joint coat and/or joint-pointing coat, so as to obtain an overall visible outer surface which is relatively uniform or plane, including in the region of the joints.

After the interior assembly work has been completed, the preparation generally involves covering the overall surface obtained, i.e., the lining of the flat prefabricated elements plus the joints, with one or more layers of a paint or priming or finishing coat. The overall visible outer surface of the flat, prefabricated boards typically needs to be prepared, before receiving any surface decoration, such as by application of one or more layers of a film covering of the paint or lacquer type or a wallpaper. This preparation is necessitated especially by the shade or color differences existing between the visible outer surface of the flat prefabricated elements, for example plasterboards, and the visible outer surface of the joints.

The preparation operation represents an appreciable additional cost, for example in a complete process for the construction of a building. And, in some cases, it is still insufficient for obtaining an overall decorated surface of uniform appearance, particularly in view of the physico-mechanical differences prevailing between the joints and the flat prefabricated elements.

SUMMARY

A coating formulation for drywall application is provided which simplifies the installation of interior walls by substantially eliminating the need for a final skim coat on the drywall. In one embodiment, the coating formulation comprises water, a binder, a filler comprising at least about 60% by weight $CaCO_3$, and a noncellulosic thickener. The coating formulation may be applied to drywall elements during manufacture of prefabricated drywall elements or may be applied upon installation of the drywall elements for interior walls.

In a further embodiment, a coating formulation for drywall application is provided comprising about 0.5 to about 30% by weight of a latex binder, about 40 to about 70% by weight of a filler comprising at least about 60% by weight $CaCO_3$, about 0.5 to about 15% by weight of a dispersant, about 0.05 to about 50% by weight of a noncellulosic thickener, and water in an amount sufficient to provide a viscosity for the formulation of about 300 to about 450 cps.

A construction assembly for interior walls is further provided comprising skim coated drywall elements comprising drywall elements having at least one skim coat deposited on the drywall elements, the skim coat formed from a coating formulation comprising water, a binder, a filler comprising at least about 60% by weight $CaCO_3$, and a noncellulosic thickener; and at least one jointing material jointing the skim coated drywall elements to form a substantially plane outer surface. Preferably, the jointing material and the drywall elements having a skim coat form, in the dry state, a substantially homogeneous outer surface for the entire surface formed of the jointing material and skim coated drywall elements.

A method for the construction of interior walls is further provided comprising assembling skim coated prefabricated drywall elements, wherein the skim coated prefabricated drywall elements have a coating layer formed from a coating formulation comprising water, a binder, a filler comprising at least about 60% by weight $CaCO_3$, and a noncellulosic thickener and are formed of at least one skim coat deposited on the prefabricated drywall elements by a coating device, jointing adjacent prefabricated drywall elements with a jointing material to form joints, and drying the jointing material. Preferably, the jointing material and the at least one skim coat form, in the dry state, a substantially homogeneous outer surface for the entire surface formed of the jointing material and skim coated prefabricated drywall elements.

A flat prefabricated drywall element is further provided comprising a core of plaster or gypsum having at least one sheet of lining paper and a coating layer formed of at least one skim coat deposited on the lining paper, the skim coat formed from a coating formulation comprising water, a binder, a filler comprising at least about 60% by weight $CaCO_3$, and a noncellulosic thickener.

DETAILED DESCRIPTION OF THE PREFERRED EMBODIMENTS

The coating provided affords improved drywall installation efficiency and improvements in texture, absorption characteristics, sanding characteristics, processing characteristics and final performance characteristics. The coated drywall product produced using the coating formulations and methods disclosed preferably provides a final surface for the drywall that substantially equals a level 5 skim-coated finish. The drywall finish levels as used herein refer to the Levels of Gypsum Board Finish of GA 214-96: *Recommended Levels of Gypsum Board Finish* published in 1996. A level 5 finish is typically recommended for areas where severe lighting conditions exist and areas that are to receive gloss, semi-gloss, enamel or non-textured flat paints.

As used herein, the term "drywall" means any wall structure especially for interior application, wherein the wall structure may be prefabricated or not prefabricated material and includes gypsum fiberboards, cement fiberboards, cement wallboards, plasterboards and the like. Drywall elements typically are made of a gypsum or plaster core sandwiched or faced in paper or cardboard and produced like sheets which may be fastened to wall frames such as with nails or screws. The drywall has a surface usually placed outwardly in an interior construction such that there is a visible outer surface or face ready to be decorated.

Conventionally, one of the sheets of paper used for making drywall elements has a dark color which can vary between a gray color and a chestnut color, since it is composed of cellulose fibers which have not undergone any particular purifying treatment. Traditionally, this so-called grey paper is obtained from unbleached chemical pulp and/or from mechanical pulp, and/or from thermomechanical pulp and/or from semi-chemical pulp. By mechanical pulp, it is usually meant a pulp obtained entirely by mechanical means from various raw materials, essentially wood, which can be provided by salvaged products originating from wood, such as old cardboard boxes, trimmings of kraft paper and/or old newspapers. Thermomechanical pulp means a pulp obtained by thermal treatment followed by a mechanical treatment of the raw material. By semi-chemical pulp is meant a pulp obtained by eliminating some of the non-cellulose components from the raw material by means of chemical treatment and requiring a subsequent mechanical treatment in order to disperse the fibers.

The other sheet of a drywall element has a visible face, called a lining face, which may be of a color generally lighter than the gray sheet. To obtain this lighter color, the layer or layers of this face are based on chemical pulp, if appropriately bleached, composed of recycled and/or new cellulose fibers, and/or on mechanical pulp, if appropriately bleached. By chemical pulp is meant a pulp obtained by eliminating a very large proportion of the non-cellulose components from the raw material by chemical treatment, for example, by cooking in the presence of suitable chemical agents, such as soda or bisulfites. When this chemical treatment is completed by bleaching, a large part of the colored substances is eliminated, as well as the substances which risk decomposing by ageing and giving unpleasant yellow shades associated with the presence of, for example, lignin. The coating provided preferably is applied to this face of the drywall; however, the coating may be applied to any type of paper or outer surface utilized in the manufacture of drywall, including printed paper and the like.

Generally, the coating is applied to all or a portion of the surface of the drywall either during prefabrication of the drywall elements or boards or after installation in the interior of a structure. The coating has a composition compatible with jointing material and is applied as a skim coat or film coat of relatively low thickness on the visible surface of the drywall. One or more coats may be applied. The coating preferably provides a substantially homogeneous appearance to the drywall even after the joints are prepared as is known in the art. The characteristics of the coating are such that the coating and other materials utilized in the installation of drywall preferably compatibly provide a substantially homogeneous appearance, especially when viewed visually during installation. The drywall installation is simplified since one or more layers of primer or paint or finishing coats are not required to complete the preparation of the wall for decoration. Specifically, in preferred embodiments, when the coating is applied to drywall, an additional skim coat or finishing coat is not required to obtain a level 5 finish.

Any commercially available jointing material may be used to complete the construction of the interior surface of the interior structure installed with coated drywall. The coating provides a smoothing of the texture of the drywall such that the fibers typically seen under primer or paint after installation of the drywall are substantially covered. Moreover, the coating changes the characteristics of the drywall to provide a surface with an absorbance closer to the absorbance of the jointing material surface when dry, which surface is thus visually substantially uniform. The coating also provides a durable surface such that the sanding on the jointing material does not easily remove or damage the coating surface. Thus, the coating preferably provides a durable surface with sufficiently smooth texture and absorbance to be substantially compatible with the jointing material.

In one embodiment, the jointing material also comprises a system including water, binder, thickener, dispersant, and filler, particularly $CaCO_3$, in amounts resulting in a material with properties suitable for a jointing material and which provides a substantially similar surface to the coating as to texture and absorbance, enabling the coating and jointing material when dry to preferably provide a level 5 finish without application of a skim or final coat. Thus, a final skim coat may be eliminated from the preparation of the wall, saving time and money when constructing interior walls. Preferably, the jointing material used is as disclosed in the copending application entitled "A System Using a Drywall Board and a Jointing Compound", filed on even date herewith and coassigned with the present application, incorporated herein by reference in its entirety. In other preferred embodiments, the jointing material may be as disclosed in U.S. Patent Application Publication Nos. 2003/0153651 and 2003/0084633, both of which are hereby incorporated by reference in their entireties.

After the coating and jointing material has been applied to drywall, the jointing material jointing the skim coated drywall elements and the skim coated drywall elements form a substantially plane outer surface comprising a surface of the jointing material and a surface of the skim coated drywall elements. This surface may then be decorated as is known in the art by application of a paint or wallpaper covering.

The coating typically is a drying type coating and the coating formulation comprises water, mineral filler, binder and thickener. The coating preferably also includes a dispersant. The water is provided in an amount effective to provide a suitable viscosity to the coating formulation such that the coating formulation may be applied by any desirable means to the drywall material.

The mineral filler may be any of the fillers known in the art for use in surface coating compositions or a combination thereof. Preferably, the mineral filler is of light color, preferably white with a grain size or particle size distribution wherein the D50 of the particles is between about 5 and about 35 μm, as determined by light scattering techniques. Too large a grain size of the filler gives rise to overall surface defects, such as a reflection of light radiation on the surface of the coat which is different from that on the surface of the drywall, bringing about differences in tone and brightness of the shade. Too large a grain size also gives rise to differences in physical appearance which are associated with the differences in roughness between the board and the coating.

Preferably, the mineral filler comprises more than about 60% calcium carbonate, more preferably more than about 75%, and most preferably, greater than about 90% calcium carbonate. Other fillers may also be used in lesser amounts, such as magnesium carbonate, dolomite, gypsum, anhydrite and the like. By way of example, a calcium carbonate filler such as Pulpro 15 from OMYA may be used. The mineral filler represents about 40 to about 70% of the total weight of the coating formulation. Preferably, the mineral filler represents about 45 to about 65% of the total weight of the coating formulation.

The coating formulation further may comprise a dispersant. The dispersant provides cohesion for the formulation, holding the components of the formulation in suspension even where the viscosity of the coating formulation is relatively low for a coating material. The dispersant may include any dispersant or mixtures thereof which function as desired, preferably any polyacrylate or polymeric acrylic salt or mixtures thereof, more preferably a salt of polyacrylate such as a sodium polyacrylate. By way of example, Acumer® 9300 or Acumer® 9400 produced by Rohm and Haas Company may be used.

The dispersant preferably represents about 0.5 to about 15.0% of the total weight of the coating formulation. More preferably, the dispersant represents about 2.0 to about 9.0% of the total weight of the coating formulation.

The coating formulation also comprises an organic binder dispersible in aqueous phase, in a proportion of between about 0.5 and about 30%, preferably about 0.5 and about 15.0%, and more preferably between about 1.0 and about 4.0%, of the total weight of the coating formulation. The binder preferably imparts sufficient flexibility to the coat to withstand mechanical stresses, and has both an adhesive capacity for obtaining a good bond on the overall surface and good resistance to attacks of ultraviolet light. In addition, the binder typically will function to harden the surface of the coating after application.

The binder in the coating formulation preferably will be a latex binder or mixtures of such binders. In a preferred embodiment, the binder is an acrylic latex binder. By way of example, an acrylic latex such as AC-630 from Rohm and Haas Company may be used.

The coating formulation further comprises a thickening agent which provides an increase in viscosity and functions to aid in holding the components of the coating formulation in suspension. The thickening agent preferably is primarily a noncellulosic thickener or a mixture of noncellulosic thickeners. In some embodiments, other thickeners known in the art such as cellulosic thickeners may be included in the formulation as part of a mixture of thickening agents. By way of example, noncellulosic thickeners generally identified as alkali soluble emulsions or hydrophobically modified alkali soluble emulsions may be used. More preferably, the thickener is a polymeric noncellulosic thickener such as a polyacrylate, especially a copolymer of an acrylic acid and an acrylic ester. In a most preferred embodiment, the thickener is a copolymer of acrylate and methacrylic acid. By way of example, ASE-60, a polyacrylate of the alkali soluble emulsion category, or TT-615, a polyacrylate of the hydrophobically modified alkali soluble emulsion category, both from Rohm and Haas Company, may be used.

The thickener generally is used in a proportion of about 0.05 to about 50%, and preferably of about 0.1 to about 5.0%, of the total weight of the coating formulation.

In addition to the water, mineral filler, dispersant, binder and thickener, at least one workability agent may be included in the composition of the coating formulation, especially a clay, in the proportion of about 0.1 to about 5.0%, and preferably of about 1.0 to about 2.0%, of the total weight of the coating formulation. The workability agent is preferably one or more silicate derivatives and, more preferably, a clay of the attapulgite type, such as M8214 from Engelhard.

An anti-cracking material or agent may also be desirable in the coating formulations. Such materials are known in the art and may include materials such as mica. By way of example, MW 200 from Oglebay Norton may be used. The anti-cracking agent may represent about 0.1 to about 20% of the total weight of the coating formulation. Preferably, the anti-cracking agent will represent about 1.0 to about 2.0% of the total weight of the coating formulation.

Other components, such as biocides, anti-foaming agents, preservatives, water treatment agents and pigments may also be incorporated in the composition of the coating formulation in the conventional way. For example, a water treatment agent may be needed to adjust the pH of the coating formulation depending on the water used or the ultimate use of the formulation. Such water treatment agent may be bicarbonate, which may be used in certain embodiments to ensure the pH is above about 8. Preservatives are known in the art and include such materials as hexahydro-1,3,5-tris(2-hydroxyethyl)-s-triazine. By way of example, Troysan 165 from Troy Corporation may be used. The additional components such as biocides, anti-foaming agents, preservatives, water treatment agents and pigments are typically used in relatively minor amounts, generally less than about 1.0% of the of the total weight of the coating formulation.

The coating formulation, by way of example, may be prepared by combining a first fraction of water with the binder and dispersant and mixing the combination. If a water treatment agent such as bicarbonate is to be added, such agent may be included in the first mixing step. The viscosity of the formulation should be kept as high as possible for as long as possible in order to effectively optimize the mixing process.

After sufficiently mixing the binder and dispersant with the first fraction of water, the mineral filler such as calcium carbonate is added, followed by the mica and the clay. If a preservative is to be used, the preservative may be added in this step, along with other optional components known to those of skill in the art. The coating formulation is further mixed prior to addition of the thickener. The remaining water preferably is added last; however, if the coating formulation mixture after addition of the mineral filler has a high viscosity, e.g., the coating formulation mixture is too thick, some water may be added prior to adding the thickener. Any water remaining may be added after addition of the thickener.

Typically, the viscosity of the formulation will be about 250 to about 1200 cps, more preferably about 300 to about 450 cps, as measured by a Brookfield viscometer at room temperature. By way of example, the viscosity may be measured for the coating formulation using T-bar spindle number S91 with 100 rpm. The viscosity of a jointing material may be measured, for example, using T-bar spindle number S94 with 2.5 rpm. The viscosity may be adjusted by any means known in the art to provide a coating formulation suitable for the desired application.

The coating formulation preferably is used on prefabricated drywall elements, preferably flat prefabricated elements such as gypsum fiberboards, cement fiberboards, gypsum wallboards, plaster boards and the like.

The coating formulation preferably is applied as a skim coat, or film coat of relatively low thickness on the outer surface of drywall made from prefabricated elements. The coat may be applied before or after the drywall is sent through a drier. Preferably, however, the coat will be applied prior to the drier so that the coat may be dried as the core is dried.

The skim coat may be applied, by way of example, in the plant by, for instance, roll coating, curtain coating, vacuum coating, spraying or the like, via a coating device, on the prefabricated element so that the skim-coated prefabricated element is delivered to the assembly site already with a skim coat on it. Alternatively, the coating formulation may be supplied to the user for application to the drywall or boards after the drywall or boards are placed into position during interior construction. The skim coat from the coating formulation provides a substantially uniform or plane surface with the joint compound used to install the drywall or boards upon which the skim coat is placed.

The coating formulation preferably is applied using a spraying device, which is operated under standard conditions for coating a product onto a board. The dimensions, rotating speed, feeding, temperature, and any other operating conditions are within the skill of a person of ordinary skill in the art. In a preferred embodiment, the coating is applied by a system as disclosed in the copending application entitled "Coating Spray Apparatus and Method of Using Same", filed on Apr. 13, 2004, and coassigned with the present application, incorporated by reference herein in its entirety.

By way of example, drywall material such as gypsum wallboard is prepared according to standard practices, including depositing a calcined gypsum slurry between two sheets. Methods of producing gypsum board, including coated gypsum board, are described for example in copending, coassigned U.S. patent application Ser. No. 10/625,624, filed Jul. 24, 2003, incorporated herein by reference in its entirety. The coating formulation may be applied after the gypsum sets but prior to the gypsum being completely dry. Thereafter, the gypsum wallboard is dried in conventional driers which dries both the coating and the gypsum. It has been discovered that the coating is sufficiently permeable to allow moisture in the gypsum to be satisfactorily eliminated through the paper and the coating thereon. An impermeable substance applied to the paper cover sheet of the gypsum wallboard when the core is still wet may cause the paper sheet to separate or delaminate from the core as moisture is driven off in the drier. The coating formulation provided, however, may be advantageously applied during manufacture of the drywall without substantially negatively affecting the drying characteristics of the core material or time required for drying the core material.

The final thickness of the coat from the coating formulation, as determined when dry, is generally between about 5 and about 60 mil, preferably between about 10 and about 15 mil.

Embodiments of the invention will now be more fully explained by the following examples. However, the scope of the invention is not intended to be limited to these examples.

EXAMPLE 1

A coating formulation according to an embodiment as set forth in Table 1 was prepared as follows:

To the first part of the water, bicarbonate, binder, and dispersant were added and mixed. The calcium carbonate was then added and mixed, followed by the mica, clay and preservative, which were also mixed. The thickener then was added and mixed into the formulation. The remaining water was added after the thickener was mixed into the formulation.

TABLE 1

| Material Name | Pounds | Dry Solids | % |
|---|---|---|---|
| Water | 294.68 | | 21.8 |
| Bicarbonate | 0.42 | 100 | 0.03 |
| AC-630 resin, binder (acrylic latex) | 25.79 | 50 | 1.91 |
| Acumer 9400, dispersant (sodium polyacrylate) | 27.09 | 42.5 | 2.00 |
| Calcium carbonate | 771.28 | 100 | 57.06 |
| Mica | 26.43 | 100 | 1.96 |
| Clay | 19.32 | 100 | 1.43 |
| ASE-60, thickener (copolymer acrylic acid, acrylic ester) | 1.62 | 28 | 0.12 |
| Water | 185.00 | | 13.6 |
| Total Pounds | 1351.63 | | |
| Weight solids (%) | | | 61.40 |
| % Dispersant - total formulation | | | 2.00 |
| % thickener - total formulation | | | 0.12 |
| % binder - total formulation | | | 1.91 |

EXAMPLE 2

A coating formulation according to Table 2 was prepared according to the procedures of Example 1.

TABLE 2

| Material Name | Pounds | Dry Solids | % |
|---|---|---|---|
| Water | 297.56 | | 21.80 |
| Bicarbonate | 0.43 | 100 | 0.03 |
| AC-630 resin, binder (acrylic latex) | 26.25 | 50 | 1.92 |
| Acumer 9300, dispersant (sodium polyacrylate) | 27.38 | 45 | 2.00 |
| Calcium carbonate | 784.89 | 100 | 57.51 |
| Mica | 26.90 | 100 | 1.97 |
| Clay | 19.66 | 100 | 1.44 |
| TT-615, thickener (copolymer acrylic acid, acrylic ester) | 1.64 | 30 | 0.12 |
| Water | 180.00 | | 13.19 |
| Total Pounds | 1364.71 | | |
| Weight solids (%) | | | 61.90 |
| % Dispersant - total formulation | | | 2.00 |
| % thickener - total formulation | | | 0.12 |
| % binder - total formulation | | | 1.92 |

While the preferred aspects of the invention have been disclosed in detail, it will be apparent to one skilled in the art that various changes and modifications can be made without departing from the spirit and scope thereof.

What is claimed is:

1. A coating formulation for drywall application comprising water, a binder present in an amount of between about 1.0% and about 4.0% by weight, a filler having a D50 between 5 and about 35 μm, said filler comprising at least about 60% by weight $CaCO_3$, and a polymeric noncellulosic thickener, wherein the coating formulation does not contain any cellulosic thickener and the viscosity of the coating formulation is from about 250 to about 1200 cps,
    further comprising a dispersant, and
    further comprising about 0.1 to about 20% by weight anti-cracking agent and about 0.1 to about 5% by weight workability agent.

2. The coating formulation of claim 1, wherein the anti-cracking agent is mica and the workability agent is clay.

3. The coating formulation of claim 1, wherein the dispersant is present in an amount of about 0.5 to about 15% by weight and the thickener is present in an amount of about 0.05 to about 50% by weight.

4. The coating formulation of claim 1, wherein the binder is a latex binder.

5. The coating formulation of claim 4, wherein the binder is an acrylic latex binder.

6. The coating formulation of claim 5, wherein the dispersant is present in an amount of about 0.5 to about 15% by weight and the thickener is present in an amount of about 0.05 to about 50% by weight.

7. A coating formulation for drywall application comprising water, a binder present in an amount of between about 1.0% and about 4.0% by weight, a filler having a D50 between 5 and about 35 μm, said filler comprising at least about 60% by weight $CaCO_3$, and a polymeric noncellulosic thickener, wherein the coating formulation does not contain any cellulosic thickener and the viscosity of the coating formulation is from about 250 to about 1200 cps,
    further comprising a dispersant, and
    wherein the dispersant comprises a sodium polyacrylate.

8. A coating formulation for drywall application comprising water, a binder present in an amount of between about 1.0% and about 4.0% by weight, a filler having a D50 between 5 and about 35 μm, said filler comprising at least about 60% by weight $CaCO_3$, and a polymeric noncellulosic thickener, wherein the coating formulation does not contain any cellulosic thickener and the viscosity of the coating formulation is from about 250 to about 1200 cps, wherein the thickener comprises a copolymer of an acrylic acid and an acrylic ester.

9. The coating formulation of claim 8, wherein the filler comprises at least about 75% by weight CaCO₃.

10. The coating formulation of claim 1, wherein the filler comprises at least about 75% by weight CaCO₃.

11. A coating formulation for drywall application comprising water, a binder present in an amount of between about 1.0% and about 4.0% by weight, a filler having a D50 between 5 and about 35 μm, said filler comprising at least about 60% by weight CaCO₃, and a polymeric noncellulosic thickener, wherein the coating formulation does not contain any cellulosic thickener and the viscosity of the coating formulation is from about 250 to about 1200 cps, wherein the filler further comprises magnesium carbonate, dolomite, gypsum, anhydrite, or mixtures thereof.

12. A coating formulation for drywall application comprising:

about 1 to about 4% by weight of a latex binder, about 40 to about 70% by weight of a filler having a D50 between 5 and about 35 μm and comprising at least about 60% by weight CaCO₃, about 0.5 to about 15% by weight of a dispersant, about 0.05 to about 50% by weight of a polymeric noncellulosic thickener, and water in an amount sufficient to provide a viscosity for the formulation of about 300 to about 450 cps, wherein the coating formulation does not contain any cellulosic thickener.

13. The coating formulation of claim 12, further comprising about 0.1 to about 20% by weight anti-cracking agent and about 0.1 to about 5% by weight workability agent.

14. The coating formulation of claim 13, wherein the anti-cracking agent is mica and the workability agent is clay.

15. The coating formulation of claim 13, wherein the dispersant comprises a sodium polyacrylate.

16. The coating formulation of claim 12, wherein the formulation comprises about 45 to about 65% by weight of a filler comprising at least about 75% by weight CaCO₃, about 2.0 to about 9.0% by weight of a dispersant, about 0.1 to about 5.0% by weight of a noncellulosic thickener.

17. The coating formulation of claim 12, wherein the latex binder comprises an acrylic latex binder.

18. The coating formulation of claim 12, wherein the thickener comprises a copolymer of an acrylic acid and an acrylic ester.

19. The coating formulation of claim 12, wherein the filler comprises at least about 75% by weight CaCO₃.

20. The coating formulation of claim 13, wherein the filler comprises at least about 75% by weight CaCO₃.

21. The coating formulation of claim 12, wherein the filler further comprises magnesium carbonate, dolomite, gypsum, anhydrite, or mixtures thereof.

* * * * *